Figure 1:
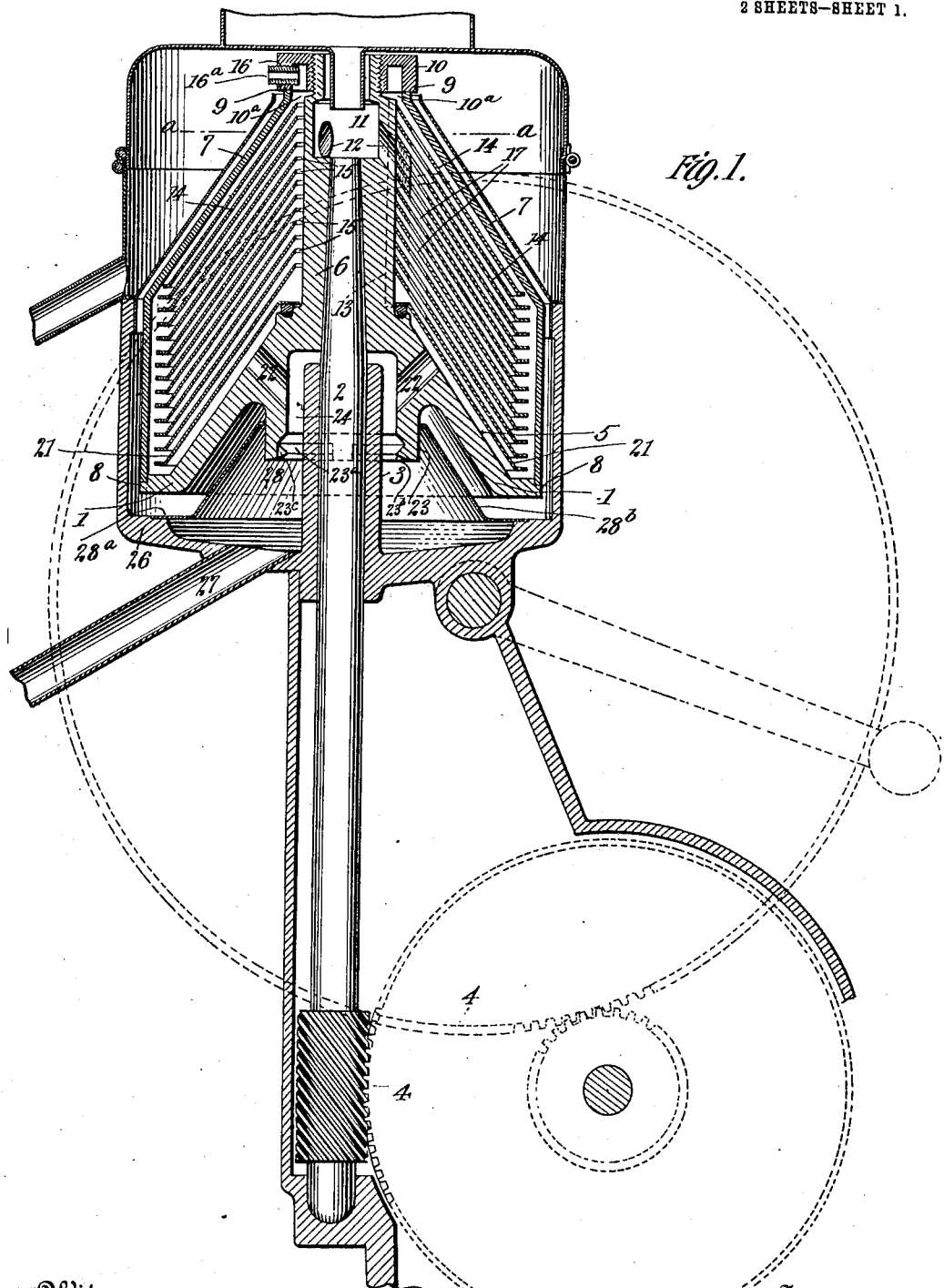

A. H. REID.
CENTRIFUGAL SEPARATING MACHINE.
APPLICATION FILED OCT. 20, 1909.

1,019,836.

Patented Mar. 12, 1912.
2 SHEETS—SHEET 1.

A. H. REID.
CENTRIFUGAL SEPARATING MACHINE.
APPLICATION FILED OCT. 20, 1909.
1,019,836.
Patented Mar. 12, 1912.
2 SHEETS—SHEET 2.
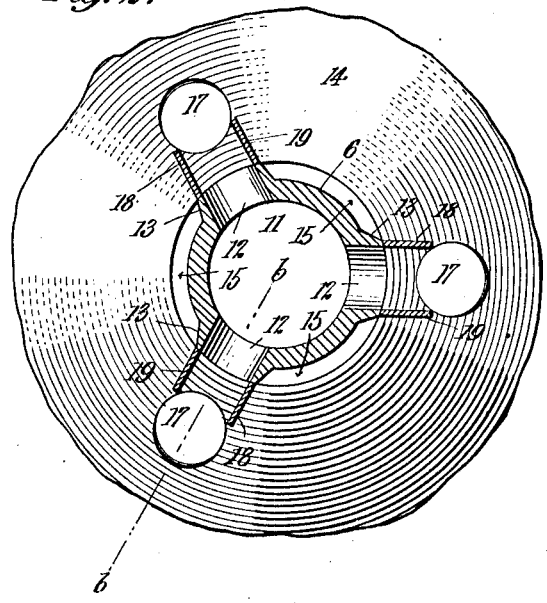
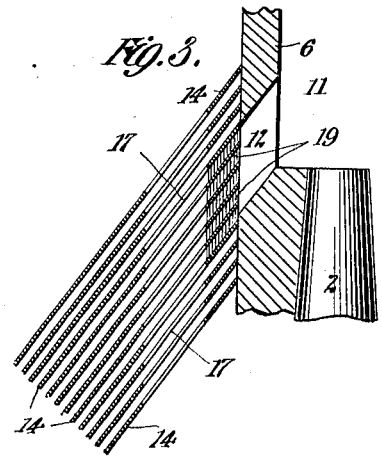
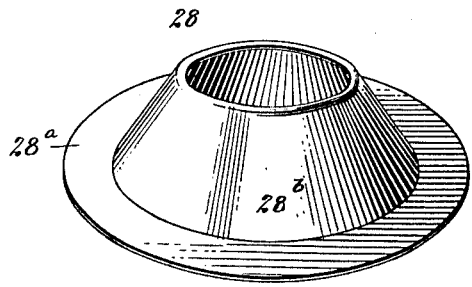

UNITED STATES PATENT OFFICE.

ALBAN H. REID, OF PHILADELPHIA, PENNSYLVANIA.

CENTRIFUGAL SEPARATING-MACHINE.

1,019,836.　　　　Specification of Letters Patent.　　Patented Mar. 12, 1912.

Application filed October 20, 1909. Serial No. 523,618.

*To all whom it may concern:*

Be it known that I, ALBAN H. REID, a citizen of the United States, residing at Philadelphia, in the county of Philadelphia and State of Pennsylvania, have invented certain new and useful Improvements in Centrifugal Separating-Machines, of which the following is a specification, reference being had therein to the accompanying drawing.

This invention relates to centrifugal machines for the separation of whole milk into its constituent elements, blue milk and cream. Machines for this purpose embody in one form or another a rotary separating bowl or vessel into which the whole milk is fed, the high rotation of the bowl acting by centrifugal force to urge the heavier constitutent, the blue milk, to the outside, which forcing the lighter body of cream toward the center, enables the two separated elements to be drawn off and discharged separately. In certain types of these machines, the bowl is divided by superposed liner plates into separate chambers, in which the whole milk fed to the bowl is divided into distinct layers or laminæ, the separation of the elements taking place simultaneously in each chamber and to a certain extent independently of the separating action in the other chambers. This has been found to result in a more expeditious and effective separation, than if the whole body of milk were treated as an entirety.

My invention consists of certain improvements in constructions of this character, designed to effect the feeding of the whole milk between the partitions in a uniform manner; the separation of the constituent elements expeditiously; and the discharge of the milk and cream in such manner that there will be no liability of intermingling.

In the accompanying drawings:—Figure 1 is a vertical section through a machine embodying my invention. Fig. 2 is a horizontal sectional plan view on the line $a$—$a$ of the preceding figure. Fig. 3 is a vertical section on the line $b$—$b$ of Fig. 2. Fig. 4 is a perspective view of a detail.

Referring to the drawings:—1 represents a rotary separating bowl or vessel, fixed to the upper end of a shaft or spindle 2, mounted in a frame or casing 3, which spindle may be driven from any suitable source of power, in the present instance by means of a hand crank geared with the spindle by suitable intermediate gearing 4.

The bowl consists of a conical base or bottom 5, formed with a central upwardly extending neck or stem 6, within which the upper end of the spindle is firmly fixed, and with a surrounding cap or body 7, the lower end of which is seated liquid-tight on a horizontal annular flange 8 on the bottom 5, and the upper end of which is engaged by a depending flange 9 on a clamping nut 10 screwed on the upper end of the neck, the flange being so disposed relatively to the neck that an annular space $10^a$ will be left between them, the purpose of which will presently appear. The lower portion of the body 7 is cylindrical, while the upper portion slopes inwardly toward the top, extending parallel or substantially so to the conical bottom.

The upper end of the neck 6, above the spindle, is cored out so as to form a central feeding chamber 11 for the whole milk, which chamber communicates at its base with the interior of the bowl by means of a number of downwardly inclined feeding openings 12, extending through the side of the neck, the latter being provided at the points where these openings are situated, with vertical ribs 13, through which the openings extend as clearly shown in Fig. 2. Arranged within the bowl are a series of superposed conical liner plates 14, formed each with a central opening to surround the neck 6, and suitably spaced apart from each other so as to divide the bowl into a number of superposed chambers into which the whole milk is fed and divided by the liners into a number of superposed bodies or laminæ. The liners at their inner edges closely surround and contact with the vertical ribs 13, by which the liners are centered and held in proper concentric positions in the bowl, segmental passages 15 being thus left between the outer surface of the neck and the inner edges of the plates, which passages extend vertically throughout the space occupied by the liners and communicate with the spaces between the liners. At their upper ends, these segmental passages communicate with the annular space $10^a$ within the nut 10, and form discharge passages for the cream, which finds its final exit through a cream discharge opening 16, extending through the flange of the nut. Adjacent the vertical ribs 13, the liner plates are provided with vertical alining holes 17 for the distribution of the whole milk fed through the inclined feed openings 12, the milk as it emerges from the feed openings entering the spaces between the plates at their inner edges, whence it passes to the vertical distributing holes, and from them flows to and is distributed in the spaces between the plates throughout the entire series.

It will be observed on reference to Fig. 3, that but a comparatively few of the spaces between the plates are in communication with the respective feed openings, and in order that the milk will be compelled to flow radially through such spaces so as to enter the vertical distributing holes with certainty, I propose to provide in these spaces, vertical walls 18 and 19, extending from the surface of the ribs at the opposite sides of the feed openings, radially to the sides of the vertical distributing holes, thereby forming radially extending passages between the feed openings and the distributing holes, which passages are closed at their sides, but are open at both ends and in communication respectively with the feed openings and the distributing holes. At their outer edges, the liner plates terminate a slight distance inward of the interior surface of the body 7 of the bowl, so that there is left at this point a vertical annular passage for the flow of the blue milk, as will be more fully described later on.

From this description, it will be seen that the whole milk fed to the interior of the bowl through the feed openings at the upper end of the neck will, by means of the vertical distributing holes, be caused to flow into and fill the space between the conical liners, the heavier constituent, the blue milk, flowing to the outside and displacing and forcing the cream toward the center, where the latter passes into the vertical segmental passages 15, then flows upward through these passages, and enters the annular space $10^a$, whence it finally escapes and is discharged through the cream discharge opening 16. The blue milk flowing outwardly from between the liners, passes downwardly in the annular space between the outer edges of the plates and the interior of the bowl, until it reaches the bottom of the latter, whence it will flow upwardly beneath a conical plate 21, situated between the base of the bowl and the lowermost liner plate, and finally escapes through a number of milk discharge openings 22 in the bottom of the bowl, the plate 21 being sealed at its inner edge to the neck of the bowl so as to close the same at this point, and prevent the cream from mixing with the milk, and compelling the milk to seek its discharge through the openings 22.

The base of the bowl is provided with a depending neck or flange 23 forming a central external chamber 24, and an annular space 25 situated between the neck and bowl bottom, the discharge openings 22 being extended through this neck so as to cause the milk to flow into the chamber 24 from the interior of the bowl. From this chamber, the milk is received by a fixed casing 26 surrounding the bowl, and from this casing it is finally discharged through an opening 27 therein.

In order that the motion of the surrounding air at the point of discharge of the blue milk, due to the high speed of the bowl, will not interfere with the flow of the milk in its final passage from the bowl, I apply beneath the depending neck 23, a shield plate 28, consisting of a horizontal annular flat plate $28^a$, seated and secured in the casing, from which annular plate a conical body $28^b$ extends upwardly and closely surrounds the depending neck 23, the milk from the chamber 24 flowing through the interior of the conical body and the annular plate before it is finally received by the fixed casing.

The cream discharge opening 16, before alluded to, is in the form of a hollow screw $16^a$, threaded into the side of the bowl at its upper end and adapted to be adjusted horizontally so as to vary the distance between the inner end of the screw and center of the bowl. In practice, it is found that if the cream discharge opening (represented by the inner end of the hollow screw $16^a$) and the milk discharge opening (represented by the inner end of the opening 22 through the flange 23) are at the same distance from or bear the same relation to the center of the bowl, the two separated elements will flow in proper relative quantities through their respective discharge openings and in thoroughly separated condition, and that any change in the relations of these openings will vary the relative amounts discharged and the richness of the cream, the adjustment of the cream discharge nearer the center than the milk discharge resulting in rich cream in less quantity, and the adjustment of the cream discharge outwardly resulting in thinner cream but in larger quantity. By screwing the hollow screw $16^a$ in or out, therefore, the character of the separated elements may be accurately and effectually controlled.

The flange 23, constituting the central external chamber 24 at the base of the bowl, is formed in its inner side, near its lower end, with a V-shaped groove $23^a$, into which the separated milk flows and collects before its final discharge into the surrounding fixed casing. In order that the milk as it leaves the chamber 24 may not pass away in the form of a thin sheet, as its tendency would be in flowing over the lower edge $23^b$ of the V-groove, and which form of discharge would be objectionable, I propose to form a number of recesses 23ᶜ in the lower edge of the V-groove, as shown in Fig. 1, with the result that the milk will be discharged through these recesses in a number of solid streams.

In the accompanying drawings I have illustrated a form and embodiment of my invention which in actual practice has been found to answer to an admirable degree the purposes to be attained, but I wish to be understood that my invention is not limited to any particular form or construction of the parts except in so far as such limitations are specified in the claims.

Having thus described my invention, what I claim is:—

1. In combination with a separating bowl provided with laterally discharging feed openings for the whole milk, a series of superposed liner plates surrounding said feed openings, with the spaces between the plates in position to receive the milk directly from the feed openings, said liner plates being provided with distributing holes arranged in substantial vertical alinement, and milk directing means situated between the liner plates inward of the distributing holes and between the same and the feed openings, and acting to prevent the milk issuing from the feed openings from flowing circumferentially between the plates before it reaches the distributing holes.

2. In combination with a rotary separating bowl provided with feed openings for the whole milk, a series of superposed liner plates arranged therein with the spaces between them communicating with the feed openings, the said plates being formed with distributing holes, and vertical walls between the feed openings and distributing holes, forming closed passages to direct the milk from the openings outwardly to the holes.

3. In combination with a bowl, a vertical neck therein provided with feeding openings, a series of superposed liner plates surrounding the neck, with the spaces between the plates communicating with the feeding openings, said plates being provided with vertically alined distributing openings, and vertical walls between the liner plates at the sides of the feeding openings and distributing holes.

4. A rotary separating bowl provided with a conical bottom having an opening therethrough for the discharge of the blue milk, said bowl having also a discharge for the cream, in combination with a series of superposed liner plates situated in the bowl and formed and disposed to leave vertical passages for the cream and milk respectively at the inner and outer sides of the bowl, means for feeding the whole milk between the liner plates, and a plate fixed beneath the lowermost liner plate and spaced from the bowl bottom, said latter plate being sealed to the bowl at its inner edge.

5. In a centrifugal cream separator, a rotary separating bowl provided with a central depending annular flange forming an external central chamber at the base and having a milk discharge opening extending through the bottom of the bowl and through the depending flange, and communicating with said central chamber, in combination with means for feeding the whole milk to the bowl.

6. A rotary separating bowl provided with a central depending annular flange forming an external central chamber at the base and having a blue milk discharge opening extending through the bottom of the bowl and through the depending flange and communicating with said central chamber, in combination with a shield extending upwardly and surrounding the flange and formed with an opening through which the blue milk is discharged.

7. A rotary separating bowl provided with a sloping bottom, in combination with a central annular flange depending from said bottom and forming a central external chamber, said bottom being formed with a milk discharge opening extending therethrough and through the depending flange, whereby the milk will be discharged into the external chamber, and a fixed shield having an upwardly extending conical body surrounding the depending flange within the space between it and the bottom of the bowl and provided with an opening through which the milk passes after leaving the chamber.

8. A rotary bowl for cream separators provided with a cream discharge opening and with a milk discharge opening, and having an external chamber into which the milk flows, said chamber being formed with an interior annular collecting groove formed in its lower wall with a recess through which the milk will flow from the groove in a solid stream.

In testimony whereof I have affixed my signature in presence of two witnesses.

ALBAN H. REID.

Witnesses:
HARRY C. EVANS, Jr.,
W. SHERWOOD CROWL.

Copies of this patent may be obtained for five cents each, by addressing the "Commissioner of Patents, Washington, D. C."